H. A. ALDEN.

Car Spring.

No. 98,540.

Patented Jan. 4, 1870.

Witnesses:
S. M. Rool
[signature]

Inventor:
Henry A. Alden
by
[signature]
his atty

United States Patent Office.

HENRY A. ALDEN, OF MATTEAWAN, NEW YORK.*

Letters Patent No. 98,540, dated January 4, 1870.

IMPROVEMENT IN VULCANIZED INDIA-RUBBER CAR-SPRINGS.

The Schedule referred to in these Letters Patent and making part of the same.

*To whom it may concern:*

Be it known that I, HENRY A. ALDEN, of Matteawan, county of Dutchess, and State of New York, have invented certain new and useful Improvements in Vulcanized India-Rubber Car-Springs; and I hereby declare the following to be a full, clear, and exact description of the same, reference being had to the accompanying drawing, in which—

Figure 1:
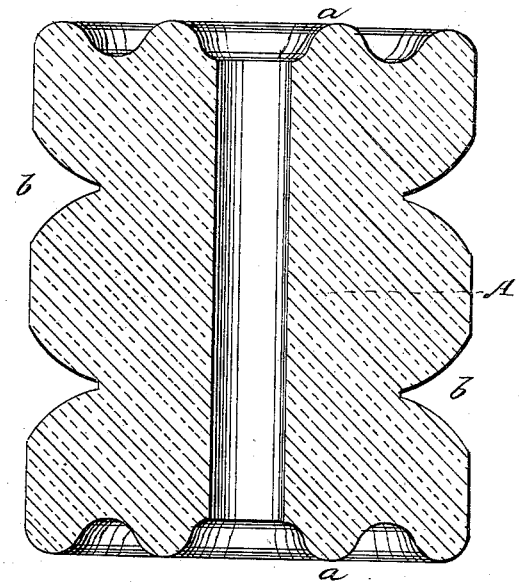
Figure 2:
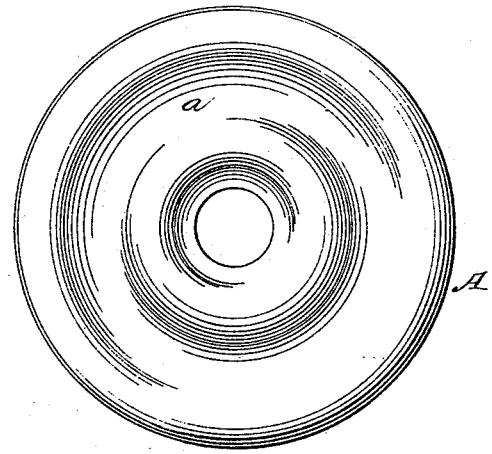

Figure 1 represents a vertical central section of a spring made in accordance with my invention, and Figure 2 is a top view of the same.

It has been, heretofore, customary to make vulcanized rubber car-springs of solid masses of rubber, made in the form of blocks, of cylindrical form, or equivalent shape.

My invention is designed to equalize the power and action of such springs, or, in other words, to make their action even and equable, under a light or a heavy load.

To this end, I provide the block A, which is composed of vulcanized India rubber, or vulcanizable compound suitable for the purpose, with corrugations, *a*, in its top or bottom, or both top and bottom, so as to form a series of ridges, upon which the load will press. These ridges or raised parts of the rubber block, form, in effect, a series of springs, which, to some extent, and under certain conditions, have an action independent of the main body of the spring-block, so that if the load be light, the projecting ridges will principally support the same, and will impart whatever spring-action is needed; and if the load be increased, the ridges or raised parts will gradually be more and more compressed, until the full power of the whole mass of rubber, of which the spring is composed, will be called into play.

Instead of corrugating the rubber block at the top and bottom, I sometimes form the corrugations, one or more in number, in the sides alone, as shown at *b*, in the drawing, where two corrugations are represented, these corrugations being of sufficient depth to divide the rubber block into a number of springs, adapted to act independently of each other, under certain conditions.

By this means, the body of the rubber cylinder or block is made up of a series of springs, which, like those above described, have, to a certain extent, an independent action when the load is light, but when the load is heavy, act together and in concert, as one spring, to resist compression.

The form of the corrugations or grooves should be such, that when the block is compressed under a heavy load, the two sides or faces of each corrugation will come together, and thus admit of the springs resting one on the other, and constituting, when thus compressed, a solid spring.

I prefer, however, to form the corrugations both in the ends and the sides of the rubber block. By this means, a much more perfectly-acting spring is obtained, and one which is equally capable of sustaining light or heavy loads. If a plain rubber cylinder or block were employed, it would, if adapted to resist heavy weights, be unfitted to give a suitable spring-support to light loads, and *vice versa*, if it should have an easy, spring-like action under a light load, it would be unfitted to support a very heavy one. My invention, however, obviates, at once, this difficulty. The corrugations divide the block into a series of springs, which, while having an independent action, to a certain extent, under a light load, will yet act with the mass of the block, and conjointly together, to resist a weight greater than the independent-spring parts of the block are able to properly sustain by themselves.

I do not limit myself to the particular form of the rubber-spring block, nor to the form of the corrugations in the same, which may be arranged concentrically, as shown in the drawing, or radially, or in any other suitable manner; and the projecting parts upon the ends may even have a teat-like or equivalent formation, if desired; but

What I claim, and desire to secure by Letters Patent, is—

1. The formation, upon one or both ends of a vulcanized India-rubber car-spring, of a series of ridges or their equivalents, projecting from the main body of the spring, substantially as and for the purposes described.

2. An India-rubber car-spring, of cylindrical or equivalent shape, having one or more annular corrugations, on one or both ends, as described, whether combined, or not, with corrugations around the body of the spring.

In testimony whereof, I have signed my name to this specification, before two subscribing witnesses.

HENRY A. ALDEN.

Witnesses:
A. POLLOK,
M. BAILEY.

*Assignor to the New York Rubber Company.